(12) United States Patent
Li

(10) Patent No.: US 12,241,586 B2
(45) Date of Patent: Mar. 4, 2025

(54) SCREEN SUPPORT

(71) Applicant: Shenzhen Zhixinda Technology Co., LTD, Guangdong (CN)

(72) Inventor: Gang Li, Guangdong (CN)

(73) Assignee: SHENZHEN ZHIXINDA TECHNOLOGY CO., LTD (CN)

( * ) Notice: Subject to any disclaimer, the term of this patent is extended or adjusted under 35 U.S.C. 154(b) by 0 days.

(21) Appl. No.: 18/378,274

(22) Filed: Oct. 10, 2023

(65) Prior Publication Data

US 2025/0003549 A1  Jan. 2, 2025

(30) Foreign Application Priority Data

Jun. 29, 2023 (CN) .......................... 202321682773.3

(51) Int. Cl.
*F16M 13/02* (2006.01)

(52) U.S. Cl.
CPC .................................. *F16M 13/02* (2013.01)

(58) Field of Classification Search
CPC ....................................................... F16M 13/02
See application file for complete search history.

(56) References Cited

U.S. PATENT DOCUMENTS

| | | | |
|---|---|---|---|
| 9,145,158 B2 * | 9/2015 | Cruz | A47C 7/723 |
| 9,285,832 B2 * | 3/2016 | Galant | G06F 21/88 |
| 9,709,213 B2 * | 7/2017 | Zheng | F16M 11/041 |
| 2012/0103863 A1 * | 5/2012 | Perez | E05B 73/0023 29/428 |
| 2013/0206942 A1 * | 8/2013 | Trotsky | F16M 13/04 248/274.1 |

* cited by examiner

*Primary Examiner* — Anita M King
(74) *Attorney, Agent, or Firm* — McDonald Hopkins LLC

(57) ABSTRACT

A screen support includes a support frame, a first U-shaped clamp, and a second U-shaped clamp. The support frame includes a first connection end and a second connection end. The first U-shaped clamp and the second U-shaped clamp are rotatably connected to the first connection end and the second connection end, respectively. The to-be-supported screen is pluggable into the jaws of the first U-shaped clamp and the second U-shaped clamp.

20 Claims, 2 Drawing Sheets

SCREEN SUPPORT

CROSS-REFERENCE TO RELATED APPLICATION(S)

This application claims priority to Chinese Patent Application No. 202321682773.3 filed Jun. 29, 2023, the disclosure of which is incorporated herein by reference in its entirety.

TECHNICAL FIELD

The present disclosure relates to the technical field of supports, in particular, a screen support.

BACKGROUND

A screen support generally refers to a lazy-man support designed to support different types of electronic products. The screen supports mainly include mobile phone supports or tablet computer supports. By the screen support, the mobile phone or tablet computer is stably placed or displayed on a desktop so that the mobile phone or the tablet computer is used more conveniently, and electronic products are used more comfortably by users.

In related art, the screen support has a single function, only supporting mobile phones of a relatively single type. When a present mobile phone or a tablet computer is changed to a mobile phone or a tablet computer of a different size and model, the screen support cannot be used, and a screen support of another type needs to be in place. As a result, the use experience of users is affected.

SUMMARY

The purpose of the present disclosure is to provide a screen support to solve the following problems: In related art, the screen support has a single function, only supporting mobile phones of a relatively single type. When a present mobile phone or a tablet computer is changed to a mobile phone or a tablet computer of a different size and model, the screen support cannot be used, and a screen support of another type needs to be in place. As a result, the use experience of users is affected.

The present disclosure adopts the technical solutions described below.

The present disclosure provides a screen support for supporting a to-be-supported screen. The screen support includes a support frame, a first U-shaped clamp, and a second U-shaped clamp.

The support frame includes a first connection end and a second connection end.

The first U-shaped clamp and the second U-shaped clamp are rotatably connected to the first connection end and the second connection end respectively to enable the jaws of the first U-shaped clamp and the second U-shaped clamp to oppose each other or face a same direction. Each of the jaws of the first U-shaped clamp and the second U-shaped clamp is configured for the to-be-supported screen to plug in.

As an alternative to the screen support, a first universal ball is disposed on the first connection end of the support frame, a first interface assembly is disposed on the first U-shaped clamp, and the first universal ball is rotatably disposed in the first interface assembly: a second universal ball is disposed on the second connection end of the support frame, a second interface assembly is disposed on the second U-shaped clamp, and the second universal ball is rotatably disposed in the second interface assembly.

As an alternative to the screen support, the first interface assembly includes a first screw cover, and a plurality of first arc-shaped plates disposed in a round on the first U-shaped clamp, the first universal ball is embeddable in the plurality of first arc-shaped plates, and the first screw cover is configured to be screwed outside the plurality of first arc-shaped plates to clamp the first universal ball: the second interface assembly includes a second screw cover, and a plurality of second arc-shaped plates disposed in a round on the second U-shaped clamp, the second universal ball is embeddable in the plurality of second arc-shaped plates, and the second screw cover is configured to be screwed outside the plurality of second arc-shaped plates to clamp the second universal ball.

As an alternative to the screen support, a plurality of first arc-shaped bumps are disposed in a round on the first U-shaped clamp and surrounded by the plurality of first arc-shaped plates, and the curved surface of the first universal ball is configured to fit and abut against the curved surface of each of the plurality of first arc-shaped bumps: a plurality of second arc-shaped bumps are disposed in a round on the second U-shaped clamp and surrounded by the plurality of second arc-shaped plates, and the curved surface of the second universal ball is configured to fit and abut against the curved surface of each of the plurality of second arc-shaped bumps.

As an alternative to the screen support, the support frame includes a first connection section, a second connection section, and a transverse connection section, and two ends of the transverse connection section are connected to the first connection section and the second connection section respectively so that the support frame forms a U-shaped structure: a free end of the first connection section and a free end of the second connection section are the first connection end and the second connection end, respectively.

As an alternative to the screen support, a first stepped portion is disposed on the first connection section, a second stepped portion is disposed on the second connection section, one end of the to-be-supported screen is configured to abut against the first stepped portion and the second stepped portion, and another end of the to-be-supported screen is configured to abut against the first U-shaped clamp and the second U-shaped clamp so that the to-be-supported screen is obliquely disposed with respect to the support frame.

As an alternative to the screen support, the support frame is configured to be inclined with respect to the to-be-supported screen at an angle in a range of 15° to 45°.

As an alternative to the screen support, the wire notch is disposed on the transverse connection section.

As an alternative to the screen support, a first support column is disposed on the first U-shaped clamp, a second support column is disposed on the second U-shaped clamp, and in a case where the jaws of the first U-shaped clamp and the second U-shaped clamp opposites each other, the first support column and the second support column are disposed in the same direction, and each of the sidewall of the first support column and the sidewall of the second support column is configured to abut against the to-be-supported screen.

As an alternative to the screen support, the support frame is a plastic frame, and both the first U-shaped clamp and the second U-shaped clamp are plastic clamps.

The present disclosure has the beneficial effects described below.

The screen support includes a support frame, a first U-shaped clamp, and a second U-shaped clamp. The support frame includes a first connection end and a second connection end. The first U-shaped clamp and the second U-shaped clamp are rotatably connected to the first connection end and the second connection end respectively to enable the jaws of the first U-shaped clamp and the second U-shaped clamp to oppose each other or face a same direction, and the to-be-supported screen is pluggable into the jaws of the first U-shaped clamp and the second U-shaped clamp. The support frame, first U-shaped clamp, and second U-shaped clamp are in contact with the support surface so that the screen support can be relatively stable when placed. When the jaws of the first U-shaped clamp are disposed opposite to the jaws of the second U-shaped clamp, a screen with a smaller width can be placed in the jaws of the first U-shaped clamp and the second U-shaped clamp. When the jaws of the first U-shaped clamp and the jaws of the second U-shaped clamp are disposed in the same direction, a screen with a larger width can be placed in the jaws of the first U-shaped clamp and the second U-shaped clamp. In this manner, another screen support is not needed to be in place, and the use experience of users is improved.

Figure 1:
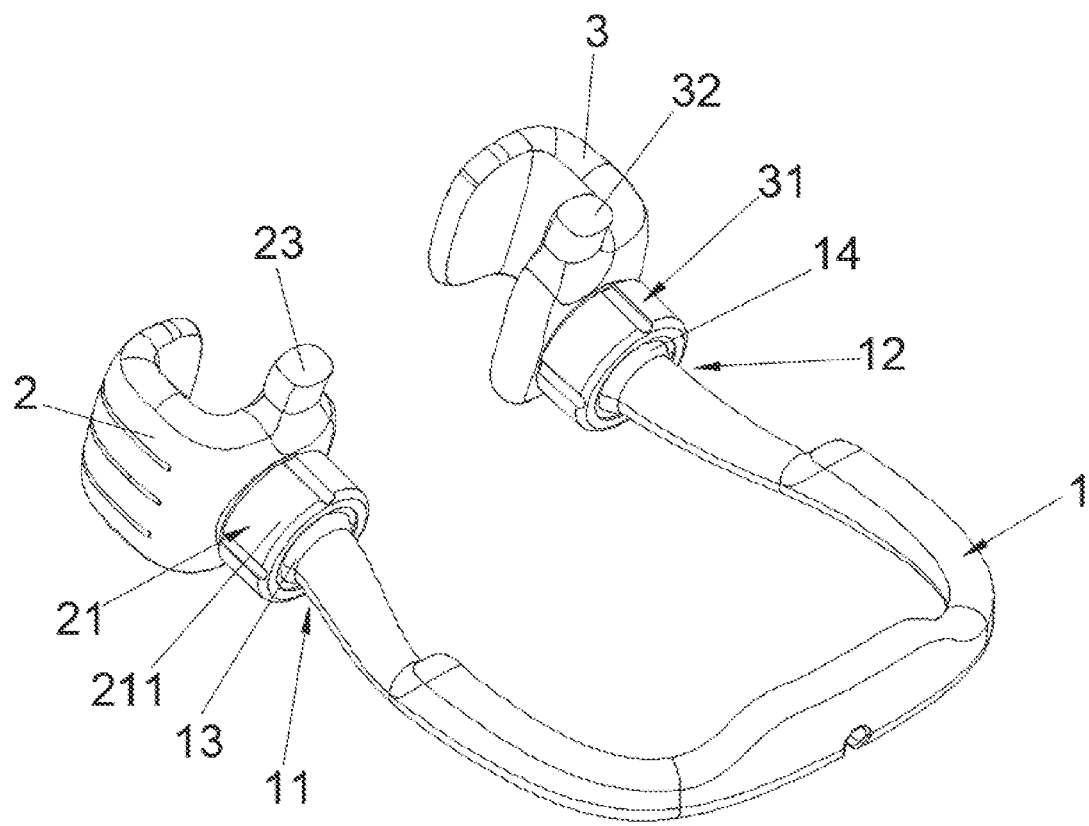
FIG. 1 is a view illustrating the structure of a screen support according to an embodiment of the present disclosure.

REFERENCE LIST 1 support frame
11 first connection end
12 second connection end
13 first universal ball
14 second universal ball
15 first connection section
151 first stepped portion
16 second connection section
161 second stepped portion
17 transverse connection section
171 wire notch
2 first U-shaped clamp
21 first interface assembly
21 first screw cover
212 first arc-shaped plate
22 first arc-shaped bump
23 first support column
3 second U-shaped clamp
31 second interface assembly
32 second support column

DETAILED DESCRIPTION

Technical solutions of the present disclosure are clearly and completely described below in conjunction with the drawings. Apparently, embodiments described herein are part, not all, of the embodiments of the present disclosure. Based on the embodiments of the present utility mode, all other embodiments obtained by those of ordinary skill in the art are within the scope of the present utility mode on the premise that no creative work is done.

In the description of the present disclosure, it should be noted that the orientations or position relations indicated by terms such as "center", "above", "below", "left", "right", "vertical", "horizontal", "inside", and "outside" are based on orientations or position relations shown in the drawings. These orientations or position relations are intended only to facilitate and simplify the description of the present disclosure and not to indicate or imply that a device or element referred to must have such specific orientations or must be configured or operated in such specific orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when the first feature is described as "on", "above", or "over" the second feature, the first feature is right on, above, or over the second feature, or the first feature is obliquely on, above, or over the second feature, or the first feature is simply at a higher level than the second feature. When the first feature is "under", "below", or "underneath" the second feature, the first feature is right under, below, or underneath the second feature, or the first feature is obliquely under, below, or underneath the second feature, or the first feature is simply at a lower level than the second feature.

In the description of the present disclosure, it is to be noted that, unless otherwise expressly specified and limited, the term "mounting", "connected to each other", or "connected" is to be construed in a broad sense, for example, as securely connected, detachably connected, or integrally connected: mechanically connected or electrically connected: directly connected to each other or indirectly connected to each other via an intermediary: or internally connected between two elements. For those of ordinary skill in the art, specific meanings of the preceding terms in the present disclosure may be understood based on specific situations.

The embodiments of the present disclosure are described in detail hereinafter. Examples of the embodiments are illustrated in the drawings, where the same or similar reference numerals indicate the same or similar elements or elements having the same or similar functions. The embodiments described below with reference to the drawings are illustrative, only for explaining the present disclosure, and not to be construed as limiting the present disclosure.

The present disclosure provides a screen support for supporting a to-be-supported screen.

Figure 2:
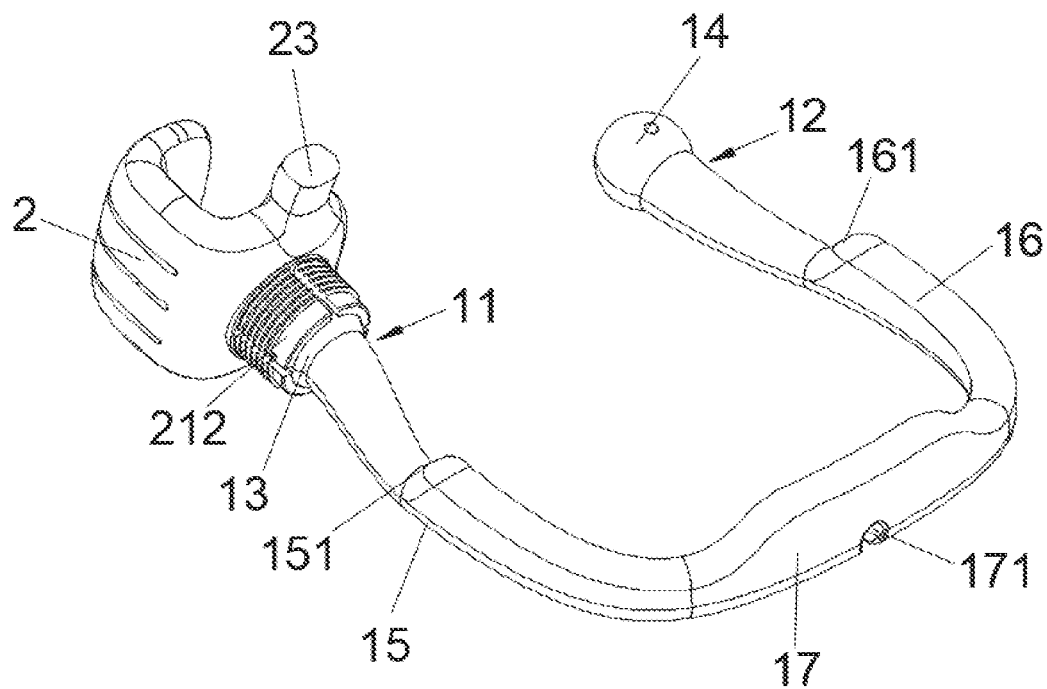
FIG. 2 is a view illustrating the partial structure of a screen support according to an embodiment of the present disclosure.
Figure 3:
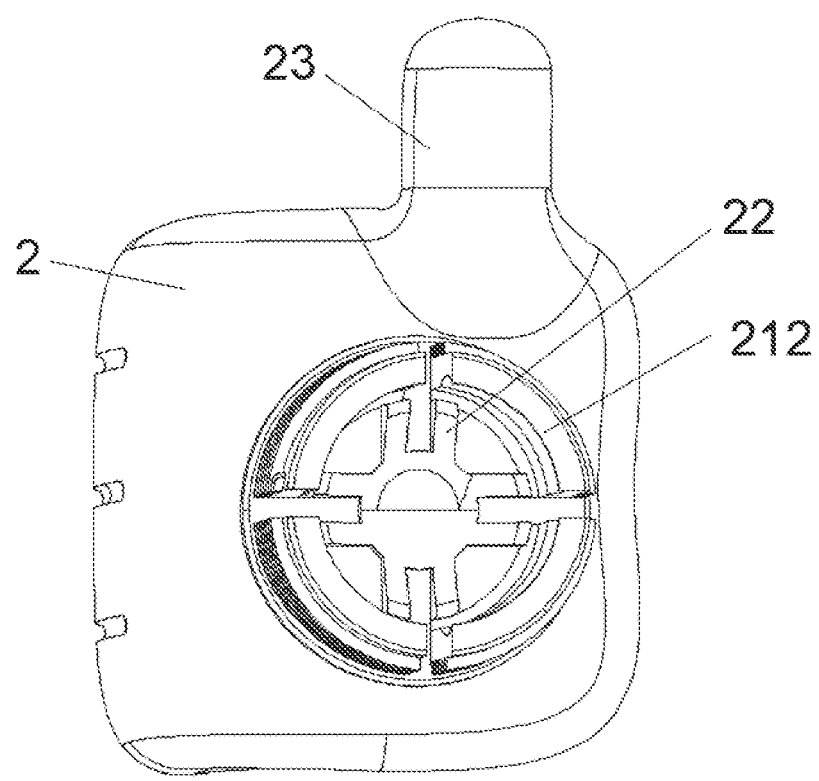
FIG. 3 is a view illustrating the structure of a first U-shaped clamp according to an embodiment of the present disclosure.

As shown in FIGS. 1 to 3, the screen support includes a support frame 1, a first U-shaped clamp 2, and a second U-shaped clamp 3. The support frame 1 includes a first connection end 11 and a second connection end 12. The first U-shaped clamp 2 and the second U-shaped clamp 3 are rotatably connected to the first connection end 11 and the second connection end 12 respectively to enable the jaws of the first U-shaped clamp 2 and the second U-shaped clamp 3 to oppose each other or face a same direction, and the to-be-supported screen is pluggable into the jaws of the first U-shaped clamp 2 and the second U-shaped clamp 3. The support frame 1, first U-shaped clamp 2, and second U-shaped clamp 3 are in contact with the support surface so that the screen support can be relatively stable when placed. When the jaws of the first U-shaped clamp 2 are disposed opposite to the jaws of the second U-shaped clamp 3, a screen with a smaller width can be placed in the jaws of the first U-shaped clamp 2 and the second U-shaped clamp 3.

When the jaws of the first U-shaped clamp 2 and the jaws of the second U-shaped clamp 3 face the same direction, a screen with a larger width can be placed in the jaws of the first U-shaped clamp 2 and the second U-shaped clamp 3. In this manner, another screen support is not needed to be in place, and the use experience of users is improved. Alternatively, the to-be-supported screen is a mobile phone or a tablet computer. Of course, the to-be-supported screen may be another screen, which is not specifically limited in the embodiment.

Further, a first universal ball 13 is disposed on the first connection end 11 of the support frame 1. A first interface assembly 21 is disposed on the first U-shaped clamp 2. The first universal ball 13 is rotatably disposed in the first interface assembly 21. A second universal ball 14 is disposed on the second connection end 12 of the support frame 1. A second interface assembly 31 is disposed on the second U-shaped clamp 3. The second universal ball 14 is rotatably disposed in the second interface assembly 31. In this manner, the position of the jaws of the first U-shaped clamp 2 and the opening angle of the jaws relative to the support frame 1 can be adjusted arbitrarily, and the position of the jaws of the second U-shaped clamp 3 and the opening angle of the jaws relative to the support frame 1 can be adjusted arbitrarily. Thus, after the to-be-supported screen is plugged into the jaws of the first U-shaped clamp 2 and the second U-shaped clamp 3, the inclination angle of the to-be-supported screen relative to the support frame 1 can be adjusted, and users' requirements for the tilt angle of the support screen are satisfied.

Specifically, the first interface assembly 21 includes a first screw cover 211, and multiple first arc-shaped plates 212 disposed in a round on the first U-shaped clamp 2, the first universal ball 13 is embeddable in the multiple first arc-shaped plates 212, and the first screw cover 211 is configured to be screwed outside the multiple first arc-shaped plates 212 to clamp the first universal ball 13. Therefore, the adjustment of the first screw cover 211 enables the multiple first arc-shaped plates 212 to clamp or loosen the first universal ball 13 to achieve the locking or rotation of the first universal ball 13. The second interface assembly 31 includes a second screw cover, and multiple second arc-shaped plates disposed in a round on the second U-shaped clamp 3, the second universal ball 14 is embeddable in the multiple second arc-shaped plates, and the second screw cover is configured to be screwed outside the multiple second arc-shaped plates to clamp the second universal ball 14. Therefore, the adjustment of the second screw cover enables the multiple second arc-shaped plates to clamp or loosen the second universal ball 14 to achieve the locking or rotation of the second universal ball 14.

Multiple first arc-shaped bumps 22 are disposed in a round on the first U-shaped clamp 2 and surrounded by the multiple first arc-shaped plates 212. The curved surface of the first universal ball 13 is configured to fit and abut against the curved surface of each first arc-shaped bump 22. In this manner, the position of the first universal ball 13 relative to the first U-shaped clamp 2 can be positioned. Multiple second arc-shaped bumps 22 are disposed in a round on the second U-shaped clamp 3 and surrounded by the multiple second arc-shaped plates. The curved surface of the second universal ball 14 is configured to fit and abut against the curved surface of each second arc-shaped bump. In this manner, the position of the second universal ball 14 relative to the second U-shaped clamp 3 can be positioned. Additionally, the impact on the installation of the support screen on the first U-shaped clamp 2 and the second U-shaped clamp 3 due to movements of the centers of the first universal ball 13 and the second universal ball 14 during rotation is avoided.

Further, the support frame 1 includes a first connection section 15, a second connection section 16, and a transverse connection section 17. Two ends of the transverse connection section 17 are connected to the first connection section 15 and the second connection section 16 respectively so that the support frame 1 forms a U-shaped structure, and a free end of the first connection section 15 and a free end of the second connection section 16 are the first connection end 11 and the second connection end 12, respectively. In this manner, the support capacity of the support frame 1 can be improved by the U-shaped structure of the support frame 1, and the screen support is prevented from toppling after the to-be-supported screen is installed. Alternatively, the wire notch 171 are disposed on the transverse connection section 17. The wire connected to the to-be-supported screen can be clamped in the wire notch 171 to fix and clamp the wire, and the use experience of users is thus improved.

Specifically, a first stepped portion 151 is disposed on the first connection section 15, a second stepped portion 161 is disposed on the second connection section 16, one end of the to-be-supported screen is configured to abut against the first stepped portion 151 and the second stepped portion 161, and another end of the to-be-supported screen is configured to abut against the first U-shaped clamp 2 and the second U-shaped clamp 3 so that the to-be-supported screen is obliquely disposed with respect to the support frame 1. In this manner, the to-be-supported screen can be supported by the first stepped portion 151, the second stepped portion 161, the first U-shaped clamp 2, and the second U-shaped clamp 3. Moreover, the to-be-supported screen can be laid down, which is convenient for a user to operate on the screen surface of the to-be-supported screen. Alternatively, the inclination angle of the to-be-supported screen with respect to the support frame 1 is in the range of 15° to 45° so that most customers' requirements for the tilt angle of the support screen are satisfied. The inclination angle of the to-be-supported screen relative to the support frame 1 is adjusted by the adjustment of the top heights of the first U-shaped clamp 2 and the second U-shaped clamp 3.

Further, a first support column 23 is disposed on the first U-shaped clamp 2, and a second support column 32 is disposed on the second U-shaped clamp 3. When the jaws of the first U-shaped clamp 2 are disposed opposite to the jaws of the second U-shaped clamp 3, the first support column 23 and the second support column 32 are disposed in the same direction, and the sidewall of the first support column 23 and the sidewall of the second support column 32 are configured to abut against the to-be-supported screen. Thus, the first support column 23 and the second support column 32 can provide auxiliary support for the to-be-supported screen and improve the stability of the to-be-supported screen installed on the screen support. When one end of the to-be-supported screen abuts against the first stepped portion 151 and the second stepped portion 161, another end of the to-be-supported screen can be lifted up by the first support column 23 and the second support column 32, thereby further adjusting the inclination angle of the to-be-supported screen relative to the support frame 1. At the same time, both the first U-shaped clamp 2 with the first support column 23 and the second U-shaped clamp 3 with the second support column 32 can form a human-hand structure so that the overall aesthetics of the screen support can be improved. Alternatively, the support frame 1 is a plastic frame, and the first U-shaped clamp 2 and the second U-shaped clamp 3 are plastic clamps. Thus, the support frame 1, the first U-shaped clamp 2, and the second U-shaped clamp 3 all have elasticity to prevent the screen support from falling and being damaged after being impacted.

Apparently, the preceding embodiments of the present disclosure are examples for clearly illustrating the present disclosure and are not intended to limit the implementations of the present disclosure. For those of ordinary skill in the art, changes or alterations in other different forms may also be made based on the preceding description.

What is claimed is:

1. A screen support for supporting a to-be-supported screen, comprising:
   a support frame comprising a first connection end and a second connection end, a first universal ball is rotatably disposed on the first connection end, a second universal ball is rotatably disposed on the second connection end; and
   a first U-shaped clamp and a second U-shaped clamp, wherein the first U-shaped clamp and the second U-shaped clamp are rotatably connected to the first universal ball and the second universal ball respectively to enable a jaw of the first U-shaped clamp and a jaw of the second U-shaped clamp to oppose each other or face a same direction;
   and each of the jaw of the first U-shaped clamp and the jaw of the second U-shaped clamp is configured for the to-be-supported screen to plug in.

2. The screen support of claim 1, wherein a first interface assembly is disposed on the first U-shaped clamp, and the first universal ball is rotatably disposed in the first interface assembly; a second interface assembly is disposed on the second U-shaped clamp, and the second universal ball is rotatably disposed in the second interface assembly.

3. The screen support of claim 2, wherein the first interface assembly comprises a first screw cover, and a plurality of first arc-shaped plates disposed in a round on the first U-shaped clamp, the first universal ball is embeddable in the plurality of first arc-shaped plates, and the first screw cover is configured to be screwed outside the plurality of first arc-shaped plates to clamp the first universal ball; and the second interface assembly comprises a second screw cover, and a plurality of second arc-shaped plates disposed in a round on the second U-shaped clamp, the second universal ball is embeddable in the plurality of second arc-shaped plates, and the second screw cover is configured to be screwed outside the plurality of second arc-shaped plates to clamp the second universal ball.

4. The screen support of claim 3, wherein a plurality of first arc-shaped bumps are disposed in a round on the first U-shaped clamp and surrounded by the plurality of first arc-shaped plates, and a curved surface of the first universal ball is configured to fit and abut against a curved surface of each of the plurality of first arc-shaped bumps; and a plurality of second arc-shaped bumps are disposed in a round on the second U-shaped clamp and surrounded by the plurality of second arc-shaped plates, and a curved surface of the second universal ball is configured to fit and abut against a curved surface of each of the plurality of second arc-shaped bumps.

5. The screen support of claim 1, wherein the support frame comprises a first connection section, a second connection section, and a transverse connection section, and two ends of the transverse connection section are connected to the first connection section and the second connection section respectively so that the support frame forms a U-shaped structure; and a free end of the first connection section and a free end of the second connection section are the first connection end and the second connection end respectively.

6. The screen support of claim 5, wherein a first stepped portion is disposed on the first connection section, a second stepped portion is disposed on the second connection section, each of the first stepped portion and the second stepped portion are configured for the to-be-supported screen to abut against, and each of the first U-shaped clamp and the second U-shaped clamp is configured for another end of the to-be-supported screen to abut against, so that the to-be-supported screen is enabled to be obliquely disposed with respect to the support frame.

7. The screen support of claim 6, wherein the support frame is configured to be inclined with respect to the to-be-supported screen at an angle in a range of 15° to 45°.

8. The screen support of claim 5, wherein a wire notch is disposed on the transverse connection section.

9. The screen support of claim 1, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

10. The screen support of claim 1, wherein the support frame is a plastic frame, and both the first U-shaped clamp and the second U-shaped clamp are plastic clamps.

11. The screen support of claim 2, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

12. The screen support of claim 3, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

13. The screen support of claim 4, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

14. The screen support of claim 5, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

15. The screen support of claim 6, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

16. The screen support of claim 7, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

17. The screen support of claim 8, wherein a first support column is disposed on the first U-shaped clamp, and a second support column is disposed on the second U-shaped clamp, wherein in a case where the jaw of the first U-shaped clamp and the jaw of the second U-shaped clamp opposites each other, the first support column and the second support column are disposed in a same direction, and each of a sidewall of the first support column and a sidewall of the second support column is configured to abut against the to-be-supported screen.

18. The screen support of claim 2, wherein the support frame is a plastic frame, and both the first U-shaped clamp and the second U-shaped clamp are plastic clamps.

19. The screen support of claim 3, wherein the support frame is a plastic frame, and both the first U-shaped clamp and the second U-shaped clamp are plastic clamps.

20. The screen support of claim 4, wherein the support frame is a plastic frame, and both the first U-shaped clamp and the second U-shaped clamp are plastic clamps.

* * * * *